Aug. 3, 1948.   M. IRELAND   2,446,284
ELECTRIC IRON
Filed Nov. 11, 1944   2 Sheets-Sheet 1
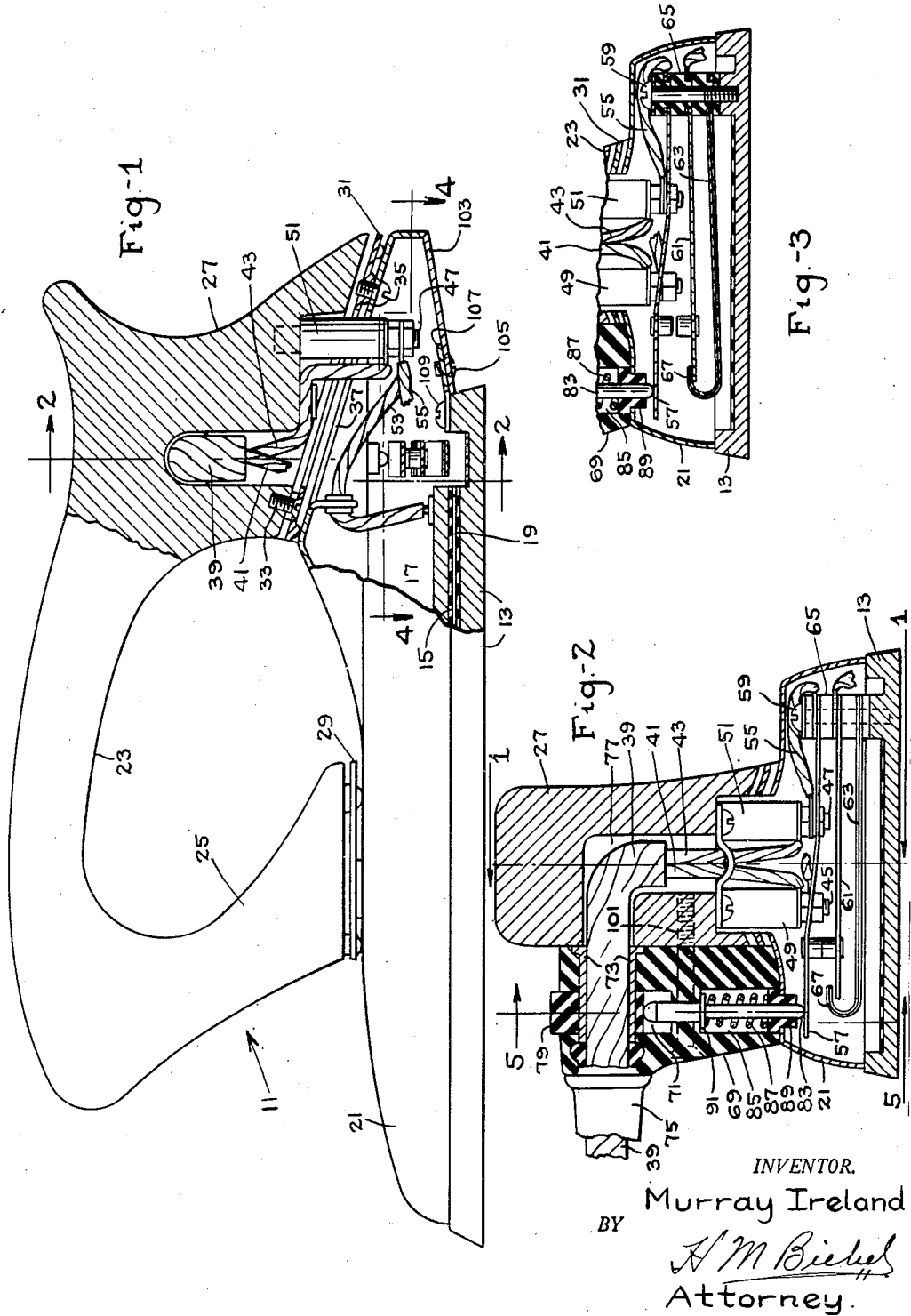
INVENTOR.
Murray Ireland
BY
H. M. Bielby
Attorney.

Aug. 3, 1948.  M. IRELAND  2,446,284
ELECTRIC IRON
Filed Nov. 11, 1944  2 Sheets-Sheet 2
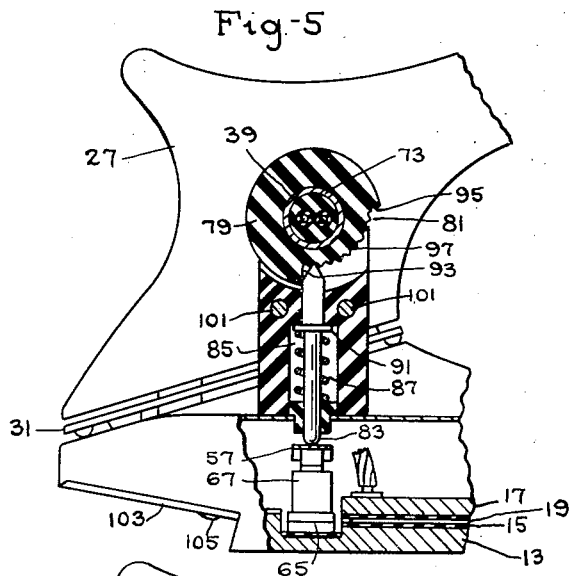
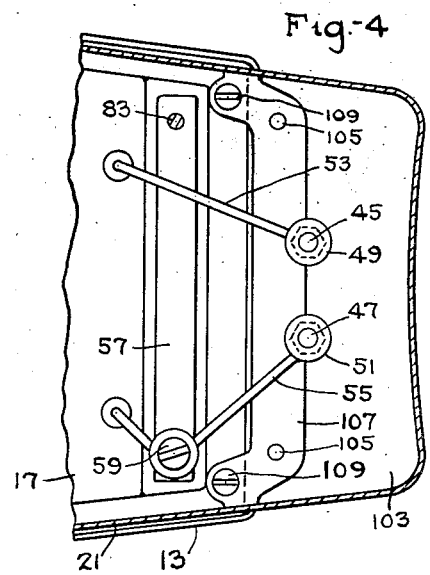
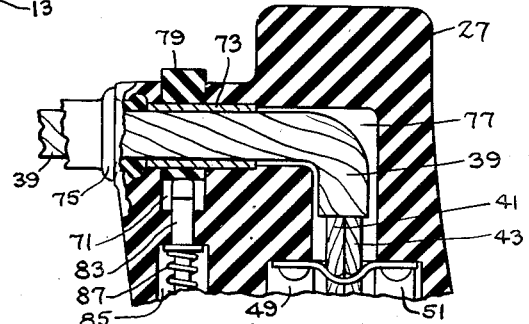
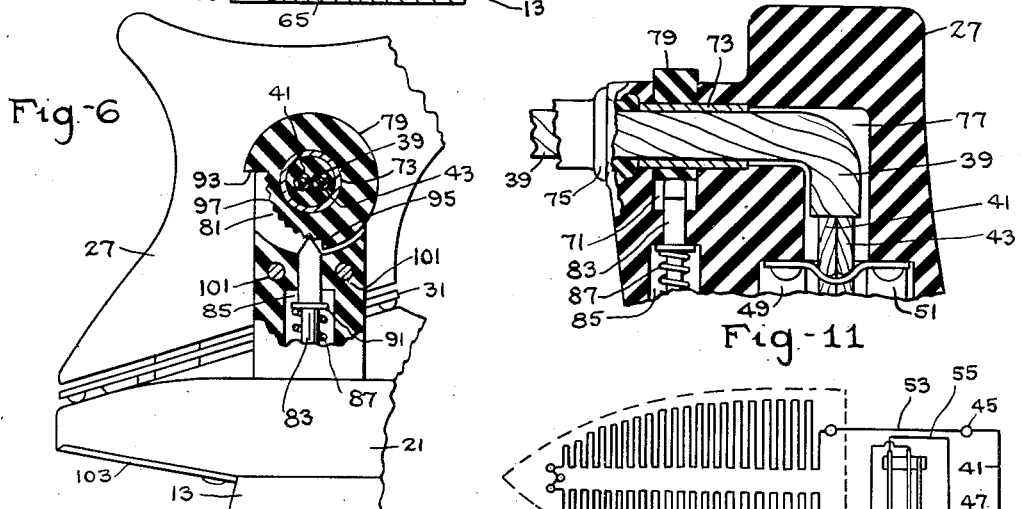
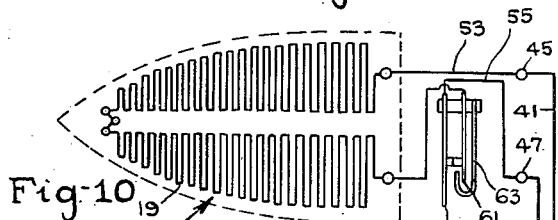
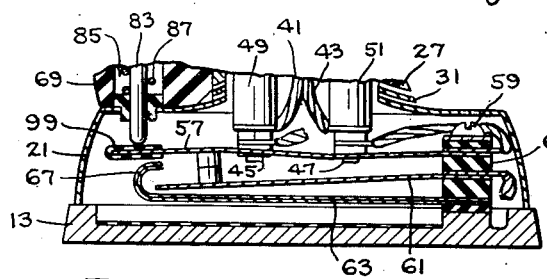
INVENTOR.
Murray Ireland
BY
H. M. Biebel
Attorney.

Patented Aug. 3, 1948

2,446,284

UNITED STATES PATENT OFFICE 2,446,284

ELECTRIC IRON

Murray Ireland, Elgin, Ill., assignor to McGraw Electric Company, Elgin, Ill., a corporation of Delaware Application November 11, 1944, Serial No. 563,017

3 Claims. (Cl. 219—25)

1

My invention relates to electric irons and particularly to terminal constructions for such devices.

An object of my invention is to provide a manually-adjustable means for determining the operating temperature of the sole plate of an electric iron that shall not be subject to high temperatures.

Other objects will either be apparent from a description of one form of device embodying my invention or will be pointed out in the course of such description and set forth particularly in the appended claims.

In the drawings,

Figure 1 is a side elevational view of an electric sadiron, partly in section, on the line 1—1 of Fig. 2, Fig. 2 is a transverse, sectional view on the line 2—2 of Fig. 1, showing the electrical contact in closed cool position, Fig. 3 is a fragmentary view similar to Fig. 2 but showing the bimetal bar when heated, with the contacts disengaged from rotatable member in the position shown in Fig. 5, Fig. 4 is a fragmentary top plan and sectional view, taken on the line 4—4 of Fig. 1, Fig. 5 is a transverse sectional view through the manually-actuable switch, taken on the line 5—5 of Fig. 2, showing the rotatable member in position for cool ironing corresponding to that shown in Fig. 2, Fig. 6 is a view similar to Fig. 5, but showing the rotatable member in position for hot ironing of clothes, Fig. 7 is a view similar to Fig. 3 but showing the position of the bimetal cold, Fig. 8 is a sectional view of the rotatable adjusting member without a serrated cam surface taken on the line 8—8 of Fig. 9, Fig. 9 is a view taken on the line 9—9 of Fig. 8, Fig. 10 is a wiring diagram showing the heating element in combination with the bimetal control, and, Fig. 11 is a transverse, sectional view, taken on the line 2—2 of Fig. 1 showing a modification in which the block is integral with the handle support.

Referring first of all to Fig. 1 of the drawings, I have there shown an electrically heated sadiron, designated generally by numeral 11 and comprising a sole plate 13, electric heating element 15, and a top or clamping plate 17. The heating element 15 may be made in any suitable or desired manner, but I have shown it as including a top and a bottom plate of electric-insulating material, such as mica, having therebetween a strip 19 of a suitable resistor material, which may be wound on a similar sheet or strip of electric-insulating material or in any other manner now well known in the art. I provide

2 further a cover 21, which has secured thereto a handle 23, which is preferably made of electric- and heat-insulating material having a front handle support 25 as well as a rear handle support 27. The front handle support 25 may be secured as by screws or bolts to an intermediate sheet 29, made of metal, which is secured to the cover 21. The rear handle support 27 is secured to an intermediate strip 31, which may either be made of metal or of a molded composition, by a plurality of screws 33, the plate 31 being secured against a rear inclined surface of the cover 21 by a plurality of screws 35. The rear inclined surface of the cover 21 is provided with an opening 37 therein for permitting of bringing in the inner end portion of a cord 39.

The cord 39 comprises twin conductors 41 and 43, which are adapted to be connected to terminal members 45 and 47, which are secured to the lower ends of rods 49 and 51 of electric-insulating material, the upper ends of which extend into the body of the rear handle support 27 and are held thereby. Terminal 45 is connected by a conductor 53 with one terminal of resistor member 19. Terminal 47 is connected by a conductor 55 to an upper resilient contact arm 57, which is secured as by a machine screw 59 to the rear end portion of the sole plate 13. The bolt or screw 59 is also effective to hold a second cooperating contact arm 61, as well as a bimetal bar 63, having the bolt or screw 59 extending through one end of members 61 and 63, with electric-insulating washers 65 therebetween. The bimetal bar 63 is in good heat-conducting relation relatively to the sole plate 13, and its free end has a return bent portion 67 effective, when the bimetal bar 63 is heated and flexes in a counter-clockwise direction, as seen in Figs. 2 and 3, to engage the second contact arm 61 and move it out of engagement with the first contact arm 57.

In order to provide means for varying the operating temperature of the ironing surface of the sole plate 13, the twin conductor cord 39 extends horizontally through a block 69 of electric- and heat-insulating material, which has a vertically extending recess 71 therein intermediate the two side walls and which is positioned at one side of the rear handle support 27. I provide a hollow bushing 73 of electric-insulating material, which extends from the inner surface of member 69 to beyond the outer edge of recess 71. I provide further a rubber bushing 75, which has interfitting engagement with member 69, so as to hold it in proper operative position. The twin conductor cord 39 extends through the bushing 75, through the bushing 73, and into a recess 77, of substantially L-shape, in the rear handle support 27. It may be here pointed out that the handle, as well as the handle supports, may be made either of molded composition or of wood, or of any electric-insulating material which can be formed into the desired shape. While I have shown a particular shape of handle and of handle supports, I do not desire to be limited thereto. While I have shown block 69 as being secured to the rear handle support, I do not desire to be limited thereto as it may also be secured to the front handle support.

I provide a substantially circular manually-adjustable member 79, of electric-insulating material, as shown in all of the figures with the exception of Figs. 7, 8, and 9, which is adapted to be positioned in recess 71 and is adapted to be rotatably mounted on bushing 73. Member 79 is provided with a peripheral recess 81, at predetermined angular extent, which is of varying depth from one of its ends to the other.

I provide further an adjusting arm 83, which is adapted to have its upper end fit into recess 81 in manually-adjustable member 79, while its lower end is adapted to engage with the upper contact arm 57. For this purpose I provide a second recess 85, which is positioned immediately below recess 71 in member 69 and position a biasing spring 87 in recess 85, the lower end of the spring engaging a closure member 89 fitted into the lower end portion of recess 85, while its upper end engages a washer 91 on arm 83, which washer engages a shoulder on arm 83 to yieldingly cause the arm to be pressed down against the upper contact arm 57.

When member 79 is in substantially the position shown in Fig. 5 of the drawings, the temperature at which the heating element 51 will maintain the sole plate will be relatively low, while when member 79 is in the position shown in Fig. 6 of the drawings, the temperature at which the ironing surface will be maintained will be relatively high. It is evident that the end surfaces 93 and 95 of the recess 81 will act as stop means for determining the minimum and the maximum temperatures at which the ironing surface will be maintained.

If it be desired to ensure that any position to which the manually-adjustable member 79 may be moved by an operator will be maintained, this can be done, as is shown by the serrated cam face 97, as is shown in Figs. 5 and 6 of the drawings.

Referring now to Fig. 7, I have there illustrated a modified form of construction between arm 57 and rod 83, comprising particularly a substantially U-shaped lug 99, secured in proper operative position to the outer free end of the upper contact arm 57. When using this piece of electric-insulating material, it is possible to make the actuating rod 83 and the manually-adjustable member 79 of metal which will insure both members of much greater life than if they were made of electric-insulating material. While I have shown the recess of 81 in Figs. 8 and 9 without the serrated surface, it is understood that it also can be serrated.

The block 69 is secured against the right hand side of the rear handle support 27, as seen when looking at the rear end of the iron, by a plurality of machine screws 101.

A rear end closure member 103 may also be provided and be held in proper operative position by screws 35 and by screws 105 securing it against a bar 107 secured to the sole plate as by screws 109.

The device embodying my invention thus positions a manually-actuable adjusting member for fixing the operating temperature of the sole plate and particularly of the ironing surface thereof at any desired value, which manually-actuable member can easily be provided with an outer knurled surface, so that it can easily be moved by the fingers of an operator.

Referring to Fig. 11, I have there shown a modified structure in which member 69 is made integral with the rear handle support 27 and in which the bushing 73 is reversed and held in proper operative position by the rubber bushing 75, all other details remaining the same.

Various modifications may be made in the device embodying my invention without departing from the spirit and scope thereof, and all such modifications coming clearly within the scope of the appended claims shall be considered as covered thereby.

I claim as my invention:

1. In an electric sadiron, the combination with a sole plate, an electric heater therefor, a thermostatic switch mechanism for controlling the temperature of the sole plate, a handle, a hollow rear handle support and a cord projecting into the hollow handle support, of a block of heat-insulating material secured to said handle support at one side thereof, a bushing in said block surrounding said cord and means on said bushing extending upwardly above the surface of said block for engagement by the operator's hand for adjusting the switch mechanism.

2. In an electric sadiron, the combination with a sole plate, an electric heater therefor, a thermostatic switch mechanism for controlling the temperature of the sole plate, a handle, a hollow handle support and a cord projecting into the hollow handle support, of a block of heat-insulating material secured to said handle support at one side thereof, a bushing in said block surrounding said cord, a rotatable member in said block on said bushing and projecting from said block for engagement by the operator's hand and a rod in said block extending from said rotatable member to said switch mechanism for changing the operative position of the switch mechanism in accordance with rotative movement of said rotatable member.

3. In an electric sadiron, the combination with a sole plate, an electric heater therefor, a thermostatic switch mechanism for controlling the temperature of the sole plate, a handle, a hollow handle support and a cord projecting into the hollow handle support, of a block of heat-insulating material secured to said handle support at one side thereof, a bushing in said block surrounding said cord, a rotatable adjusting member on said bushing in said block and projecting therefrom for manual operation, means in said block for transmitting motion from the rotatable member to the switch mechanism to adjust the same and means on said rotatable member for limiting the rotation thereof to predetermine the range of the thermostatic switch mechanism.

MURRAY IRELAND.

REFERENCES CITED

The following references are of record in the file of this patent:

UNITED STATES PATENTS

| Number | Name | Date |
| --- | --- | --- |
| 1,378,082 | Yoder | May 17, 1921 |
| 1,620,184 | Bersted | Mar. 8, 1927 |
| 1,689,809 | Vaughan | Oct. 30, 1928 |
| 1,755,612 | Runsvold | Apr. 22, 1930 |
| 2,195,002 | Clark | Mar. 26, 1940 |